(12) United States Patent
Magnezi et al.

(10) Patent No.: US 11,824,754 B2
(45) Date of Patent: Nov. 21, 2023

(54) MULTI-CLUSTER NETWORKING USING HUB AND SPOKE ELASTIC MESH

(71) Applicant: Red Hat, Inc., Raleigh, NC (US)

(72) Inventors: Nir Magnezi, Raanana (IL); Michael Kolesnik, Raanana (IL)

(73) Assignee: Red Hat, Inc., Raleigh, NC (US)

(*) Notice: Subject to any disclaimer, the term of this patent is extended or adjusted under 35 U.S.C. 154(b) by 16 days.

(21) Appl. No.: 16/702,407

(22) Filed: Dec. 3, 2019

(65) Prior Publication Data
US 2021/0168061 A1 Jun. 3, 2021

(51) Int. Cl.
| | |
|---|---|
| H04L 12/26 | (2006.01) |
| H04L 29/08 | (2006.01) |
| H04L 12/46 | (2006.01) |
| H04L 43/16 | (2022.01) |
| H04L 67/10 | (2022.01) |
| H04L 43/0852 | (2022.01) |
| H04L 43/0888 | (2022.01) |
| H04L 43/0882 | (2022.01) |

(52) U.S. Cl.
CPC .......... *H04L 43/16* (2013.01); *H04L 12/4641* (2013.01); *H04L 43/0852* (2013.01); *H04L 43/0882* (2013.01); *H04L 43/0888* (2013.01); *H04L 67/10* (2013.01)

(58) Field of Classification Search
CPC . H04L 43/16; H04L 43/0888; H04L 43/0852; H04L 67/10; H04L 43/0882; H04L 12/4641
See application file for complete search history.

(56) References Cited

U.S. PATENT DOCUMENTS

| | | | |
|---|---|---|---|
| 9,686,127 B2 | 6/2017 | Ramachandran et al. | |
| 2010/0150155 A1* | 6/2010 | Napierala | H04L 45/16 370/390 |
| 2020/0252234 A1* | 8/2020 | Ramamoorthi | H04L 45/22 |

OTHER PUBLICATIONS

Mark Barrett et al., "ADVPN design and implementation", located at https://text.123doc.org/document/4188335-advpn-design-and-implementation.htm, pp. 1-12, Juniper Networks Books, retrieval date Sep. 19, 2019.

* cited by examiner

Primary Examiner — Padma Mundur
(74) Attorney, Agent, or Firm — Womble Bond Dickinson (US) LLP (57) ABSTRACT

A method is provided that includes receiving, from a first cluster, data intended for a second cluster and routing the data to the second cluster, thereby forming an indirect connection between a first cluster and the second cluster. A network usage of the indirect connection may be monitored and in response to determining that the network usage of the indirect connection exceeds a network usage threshold, a respective remote agent of each of the first and second clusters may be instructed to form a direct connection between the first and second clusters. The network usage of the direct connection may be monitored and in response to determining that the network usage of the direct connection is below the network usage threshold, the respective remote agent of each of the first and second clusters may be instructed to remove the direct connection.

17 Claims, 9 Drawing Sheets

MULTI-CLUSTER NETWORKING USING HUB AND SPOKE ELASTIC MESH

BACKGROUND

A network or data center may include a number of components (e.g., network devices, computing devices, an application running on a computing device or network device etc.) capable of communicating data with other devices through a wired or wireless connection or set of connections. A network may be implemented as a public network (e.g., the internet), a private network (e.g., a local area network (LAN) or wide area network (WAN)), or a combination thereof, for example. With respect to wide area networks (WANs), there are a number of models currently in use. For example, a hub-and-spoke model involves multiple remote clusters (i.e. spokes) all connected to each other via a central site (i.e. the hub), where each cluster is connected to the central site via a virtual private network (VPN) link. By contrast, a full mesh, or hybrid WAN model connects every cluster directly to each other cluster (e.g., via a VPN link), without the need for a centralized hub to route communications between the clusters.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A traditional hub-and-spoke model results in an increased amount of data that flows through the hub, which results in a toll on the network bandwidth through the hub and increased latency. Because all traffic needs to travel through the hub (i.e. the same choke point), an increase in network traffic latency and loss of bandwidth through the hub will be experienced. This problem is especially significant once the network begins to scale (e.g., to hundreds or thousands of clusters). In addition, traditional hub-and-spoke models may result in a single point of failure, wherein if the hub is deactivated or experiences a connectivity problem, all the clusters will lose connectivity as well.

Although hybrid network models do not involve a single point of failure (as there is no single hub), they require each cluster to maintain an open tunnel to all other clusters, resulting in significant cost and complexity to set up and maintain. When scaling this type of topology, this increases the number of tunnels that each cluster must constantly keep open. In addition, because not all tunnels are always used, large amounts of resources may be wasted maintaining open tunnels that are not currently in use. Further, such large and complicated deployments require skilled administration and/or constant, machine learning-backed monitoring to maintain.

Aspects of the present disclosure address the above noted and other deficiencies by using a processing device to receive, from a first cluster, data intended for a second cluster and route the data to the second cluster, thereby forming an indirect connection between the first cluster and the second cluster. An indirect connection may refer to a connection between two clusters formed via a hub. The processing device may monitor a network usage of the indirect connection and in response to determining that the network usage of the indirect connection exceeds a network usage threshold, instruct a respective remote agent of each of the first and second clusters to form a direct connection between the first and second clusters. The direct connection may be a virtual private network (VPN) tunnel, for example. Upon establishing the direct connection, the respective remote agents of the first and second clusters may advertise internet protocol (IP) addresses of components in their respective host clusters to each other, to facilitate communication between the two. The processing device may monitor a network usage of the direct connection by requesting reports on the network usage of the direct connection from the respective remote agents of the first and second clusters. In response to determining that the network usage of the direct connection is below the network usage threshold, the processing device may instruct the respective remote agent of each of the first and second clusters to remove the direct connection.

The respective remote agent of each of the first and second clusters may monitor network usage information of direct connections they have formed with other clusters and report such information to the processing device in response to a query from the processing device for such information. The processing device may determine which direct connections should be maintained and which should be closed based on the network usage information of each direct connection and the network usage threshold, as discussed herein. Each respective remote agent may remotely accept commands from the processing device to open or close direct connections with other clusters. In this way, only direct connections that are experiencing adequate usage levels (e.g., usage levels that are above the network usage threshold) may remain open, while direct connections that are not experiencing adequate usage levels (e.g., usage levels that are below the network usage threshold) may be closed, thus ensuring that resources are not wasted on idle/low use direct connections.

Figure 1A:
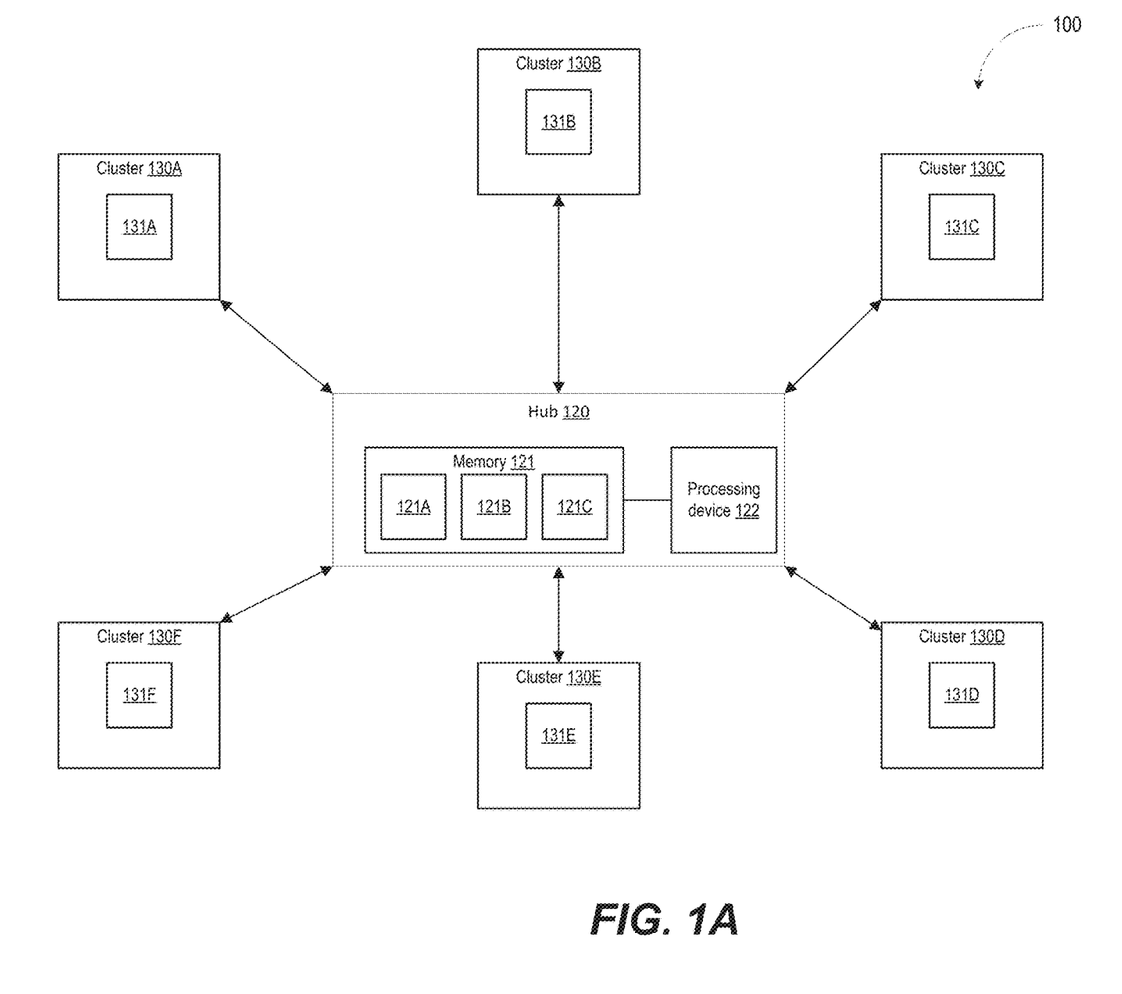
FIG. 1A is a block diagram illustrating an example of a cluster network such as a WAN, in accordance with some embodiments of the present disclosure.

FIG. 1A is a block diagram that illustrates an example network 100, in accordance with some embodiments of the present disclosure. As illustrated in FIG. 1A, the network 100 may include a hub 120 and a plurality of clusters 130A-130F. The hub 120 may include hardware such as processing device 122 (e.g., processors, central processing units (CPUs), memory 121 (e.g., random access memory (RAM), storage devices (e.g., hard-disk drive (HDD), solid-state drive (SSD), etc.), and other hardware devices (e.g., sound card, video card, etc.). The hub 120 may comprise any suitable type of computing device or machine that has a programmable processor including, for example, server computers, desktop computers, laptop computers, tablet computers, smartphones, set-top boxes, etc. The hub 120 as well as each spoke 130 may comprise a single machine or may include multiple interconnected machines (e.g., multiple computers configured in a network or cluster). Thus, in some embodiments, network 100 may be considered a network of networks (or a network of clusters). The hub 120 may be coupled to each cluster 130 (e.g., may be operatively coupled, communicatively coupled, may communicate data/messages (e.g., packet capture requests and captured packets) with each other) through a tunnel connection, such as a virtual private network (VPN) tunnel, for example. Network 100 may be a public network (e.g., the internet), a private network (e.g., a local area network (LAN) or wide area network (WAN)), or a combination thereof. In one embodiment, network 100 may include a wired or a wireless infrastructure, which may be provided by one or more wireless communications systems, such as a WiFi™ hotspot connected with the network 100 and/or a wireless carrier system that can be implemented using various data processing equipment, communication towers (e.g. cell towers), etc. The network 100 may also include various components such as switches, routers, bridges, gateways, server computers, cables, chips integrated circuits, etc. that are not illustrated in FIG. 1A for ease of illustration.

Figure 1B:
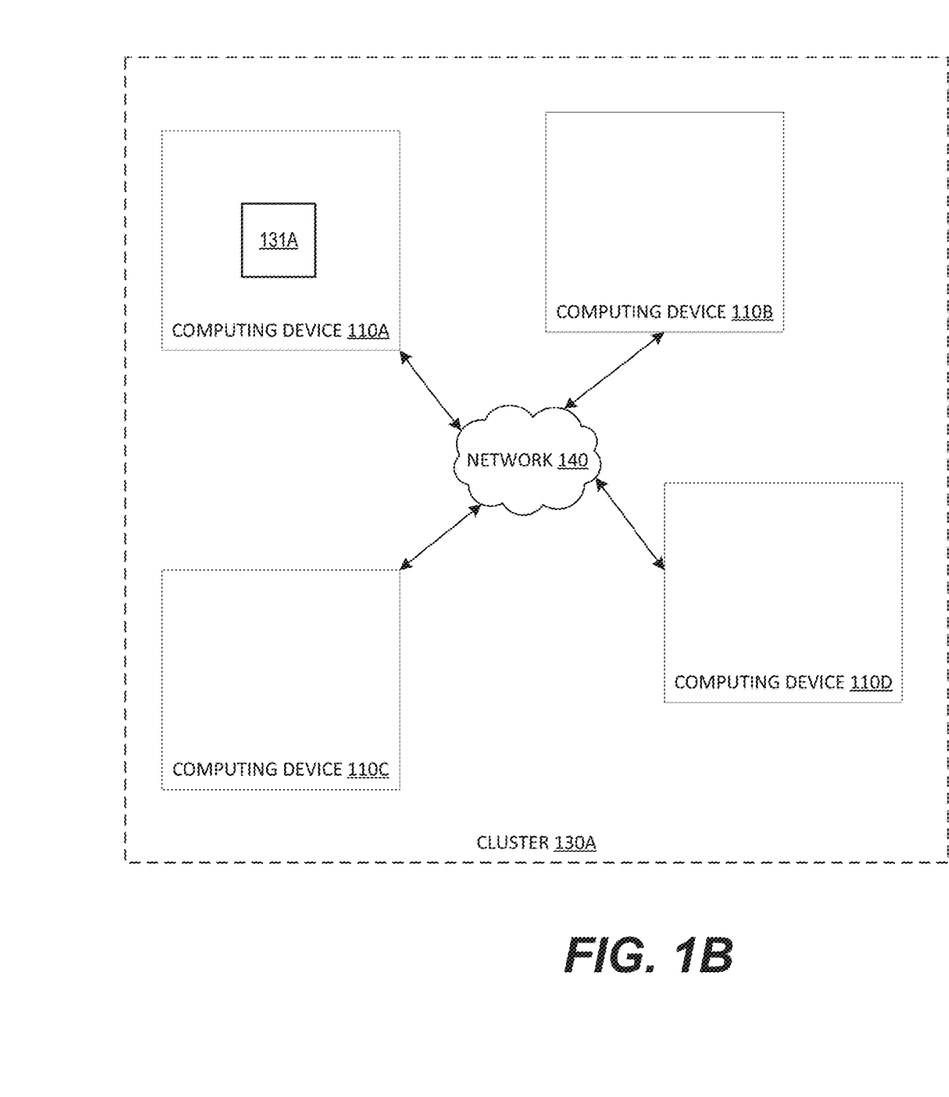
FIG. 1B is a block diagram illustrating an example of a cluster, in accordance with some embodiments of the present disclosure.

FIG. 1B is a block diagram that illustrates an example cluster 130A. As illustrated in FIG. 1B, the cluster 130A includes a plurality of computing devices 110A-110D (which may also be referred to as nodes of the cluster 130A). The computing devices 110 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may carry communications (e.g., data, message, packets, frames, etc.) between computing devices 110. Each computing device 110 may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). Each computing device 110 may comprise any suitable type of computing device or machine that has a programmable processor including, for example, server computers, desktop computers, laptop computers, tablet computers, smartphones, set-top boxes, etc. In some examples, each of the computing devices 110 may comprise a single machine or may include multiple interconnected machines (e.g., multiple servers configured in a cluster). The computing devices 110 may be implemented by a common entity/organization or may be implemented by different entities/organizations. For example, a first computing device 110 may be operated by a first company/corporation and a second computing device 110 may be operated by a second company/corporation. Each computing device 110 may execute or include an operating system (OS). The OS of a computing device 110 may manage the execution of other components (e.g., software, applications, etc.) and/or may manage access to the hardware (e.g., processors, memory, storage devices etc.) of the computing device.

In some embodiments, one or more of computing devices 110 may be a virtual machine (VM). A VM may be an emulation of a computing device. The VM may execute on a hypervisor (not shown) which executes on top of an operating system for a host computing device. The hypervisor may manage system resources (e.g., may manage access to hardware devices, such as processors, memories, storage devices, etc., of the host computing device). The hypervisor may also emulate the hardware (or other physical resources) which may be used by the VM to execute software and/or applications.

Referring back to FIG. 1A, the hub 120 may include hub management software (SW) component 121A, which may be executed by processing device 122 to perform one or more functions described herein such as managing remote agents 131 as well as recording and monitoring inter-cluster connections, as described in further detail herein. The hub 120 may include a routing table, including the cluster address of each cluster 130 as well as the IP addresses of the respective nodes of each cluster 130 (e.g., as advertised by each cluster 130's remote agent 131).

Each cluster 130 may include a remote agent 131, which may be software or logic that performs one or more of the functions described herein. For example, each remote agent 131 may remotely accept commands from the hub 120 to open or close direct connections with other clusters 130, query the hub 120 for routes, advertise the cluster address of its host cluster 130 and the IP addresses of its host cluster's respective nodes to the hub 120 so other clusters 130 can learn about them from the hub 120, advertise IP addresses of nodes within its host cluster to other clusters it is directly connected to, report network usage information of direct connections with other clusters 130 to the hub 120, and allow the hub 120 to query it for network usage information of such direct connections. Each remote agent 131 may execute on a managing node of its host cluster 130 and may utilize its host cluster's open tunnel connection to the hub 120 for management purposes, as discussed in further detail herein. As shown in the example of FIG. 1B, the remote agent 131A may execute on computing device 110A, which may be the managing node of the cluster 130A. Referring back to FIG. 1A, each remote agent 131 may include a routing table including addressing information for one or more clusters 130, and may update its routing table when a connection changes (e.g., from indirect to direct) or is closed.

Network 100 may be initialized with each remote agent 131 being registered with the hub 120. Each cluster 130 may initially be configured with an open tunnel connection (e.g., VPN tunnel) to the hub 120, and no connection to any other cluster 130. As discussed above, the hub 120 may include routing information for each of the clusters 130. Thus, when cluster 130A wishes to communicate with an address in cluster 130B, it may transmit the data to be communicated (via its tunnel connection) to hub 120, which may form an indirect connection to cluster 130B. As used herein, an indirect connection may refer to a connection between two clusters 130 formed via the hub 120. Thus, when cluster 130A transmits data intended for cluster 130B to the hub 120, the hub 120 may utilize its routing information to route the data to the cluster 130B. The hub 120 may also detect this indirect connection and record it within the network addressing database 121B as discussed in further detail herein. The hub 120 may maintain a record of all direct and indirect connections between clusters 130 and monitor the network usage of each connection based on that connection's network usage information. The network usage information of a connection (direct or indirect) may include a number of factors including the time length of the connection, the data throughput of the connection, bandwidth of the connection, and the latency of the connection, for example. The hub 120 may also include (e.g., in memory 121) a network usage threshold, which may be defined by e.g., a network administrator and may dictate when a direct connection between two clusters 130 should be created and when it should be closed. The network usage threshold may be based on threshold values for a number of the network usage factors including the time length of the connection between two clusters 130, a maximum data throughput of the connection, a maximum bandwidth of the connection, and a maximum latency of the connection, for example. The network usage threshold may be based on one or more of the above enumerated factors as discussed in further detail herein. The hub 120 may further include network addressing database 121B which may include a routing table having the cluster address of each cluster 130 as well as the IP addresses of the respective components of each cluster 130 (e.g., as advertised by each cluster 130's remote agent 131). The network addressing database 121B may further include a connection table which the hub 120 may use to record all inter-cluster connections.

For example, when the hub 120 detects that the network usage for a particular indirect connection between cluster 130A and 130B exceeds the network usage threshold, it may instruct the remote agents 131A and 131B of clusters 130A and 130B respectively (via their respective tunnel connections to the hub 120) to establish a direct connection with each other. The direct connection may be a VPN tunnel, for example. The direct connection may be utilized with any appropriate protocol (whether secured or unsecured) such as VXLAN, generic routing encapsulation (GRE), and internet protocol security (IPsec), for example. The hub 120 may include in its instruction to remote agent 131A, the cluster address of the cluster 130B and vice versa to allow the remote agents 131A and 131B to establish the direct connection, and each of the remote agents 131A and 131B may update their routing table with this information, so that the hub 120 is no longer a hop on the route between clusters 130A and 130B. In addition, each of the remote agents 131A and 131B may advertise IP addresses of nodes in their host clusters (130A and 130B respectively) to each other so as to facilitate communication between them. Thus, information from cluster 130A that is destined for cluster 130B may be routed directly to cluster 130B and so on. The hub 120 may record the direct connection between clusters 130A and 130B in its connection table.

In one embodiment, the network usage threshold may be based on a single network usage information factor. For example, the network usage threshold may be based on the amount of time an indirect connection between two clusters has existed. Thus, if the indirect connection lasts longer than a threshold amount of time, then hub 120 may instruct the remote agents 131 of the clusters in the indirect connection to establish a direct connection between them. Similarly, the network usage threshold may be based on the data throughput (e.g., packets per second) of the indirect connection. Thus, if the data throughput of the indirect connection exceeds a threshold data throughput, then hub 120 may instruct the remote agents 131 of the clusters 130 that are indirectly connected to establish a direct connection with each other. In some embodiments, the network usage threshold may be based on one or more of the factors listed above. For example, the network usage threshold may specify that if two or more usage information factors (e.g., latency and throughput) exceed certain threshold values, then hub 120 may instruct the remote agents 131 of clusters involved in the indirect connection to establish a direct connection. In another example, the network usage threshold may specify a certain amount of time that one or more of the network usage information factors may need to exceed specified threshold values for (e.g., to prevent a direct connection from being formed in response to a momentary spike in throughput). In other embodiments, the network usage threshold may be based on a sliding scale of one or more of the factors discussed above.

When establishing a direct connection, the remote agents 131 involved may utilize any appropriate handshaking or security protocol to ensure that the direct connection is secure. Each remote agent 131 may monitor the network usage information of each direct connection that its host cluster 130 has with other clusters 130. As discussed above, a remote agent 131 may monitor the time length of the direct connection, the data throughput of the direct connection, bandwidth of the direct connection, and the latency of the direct connection, for example. Each remote agent 131 may report the network usage information of each direct connection that its host cluster 130 has with other clusters 130 to the hub 120 periodically. In some embodiments, each remote agent 131 may report the network usage information of each direct connection in response to a request from the hub 120. In this way, the hub 120 may monitor network usage of each direct connection by periodically requesting network usage information of each direct connection from the remote agents 131 of the corresponding clusters 130. If the hub 120 determines that the network usage of any direct connection has fallen below the network usage threshold, it may instruct the remote agents 131 of the clusters 130 in that direct connection to close the direct connection and revert back to using the indirect connection they previously utilized to communicate. In some embodiments, if the hub 120 determines that the network usage of a direct connection has fallen below the network usage threshold, it may instruct the remote agents 131 of the clusters 130 in that direct connection to close the direct connection and cease communication between those clusters. In some embodiments, in response to receiving usage information for a direct connection that indicates that the network usage of that direct connection is below the network usage threshold, the hub 120 may wait until a subsequent network usage level report before instructing the remote agent to close the direct connection. For example, in response to receiving network usage information for a direct connection that indicates that the direct connection is below the network usage threshold, the hub 120 may monitor subsequent network usage information reports from that remote agent 131 for a certain amount of time to see if the network usage returns to above the network usage threshold, and if they do not, instruct the remote agent 131 to close the direct connection.

In this way, only direct connections that are experiencing adequate usage levels (e.g., usage levels that are above the network usage threshold) may remain open, while direct connections that are not experiencing adequate usage levels (e.g., usage levels that are below the network usage threshold) may be closed, thus ensuring that resources are not wasted on idle/low use direct connections. Because the hub 120 only maintains indirect connections that are relatively low usage, it may not experience a high network bandwidth toll, and the amount of data lost in the event of a failure of the hub 120 may be mitigated.

In some embodiments, the functionality of the remote agents 131A-E may be implemented by the hub 120.

Figure 1C:
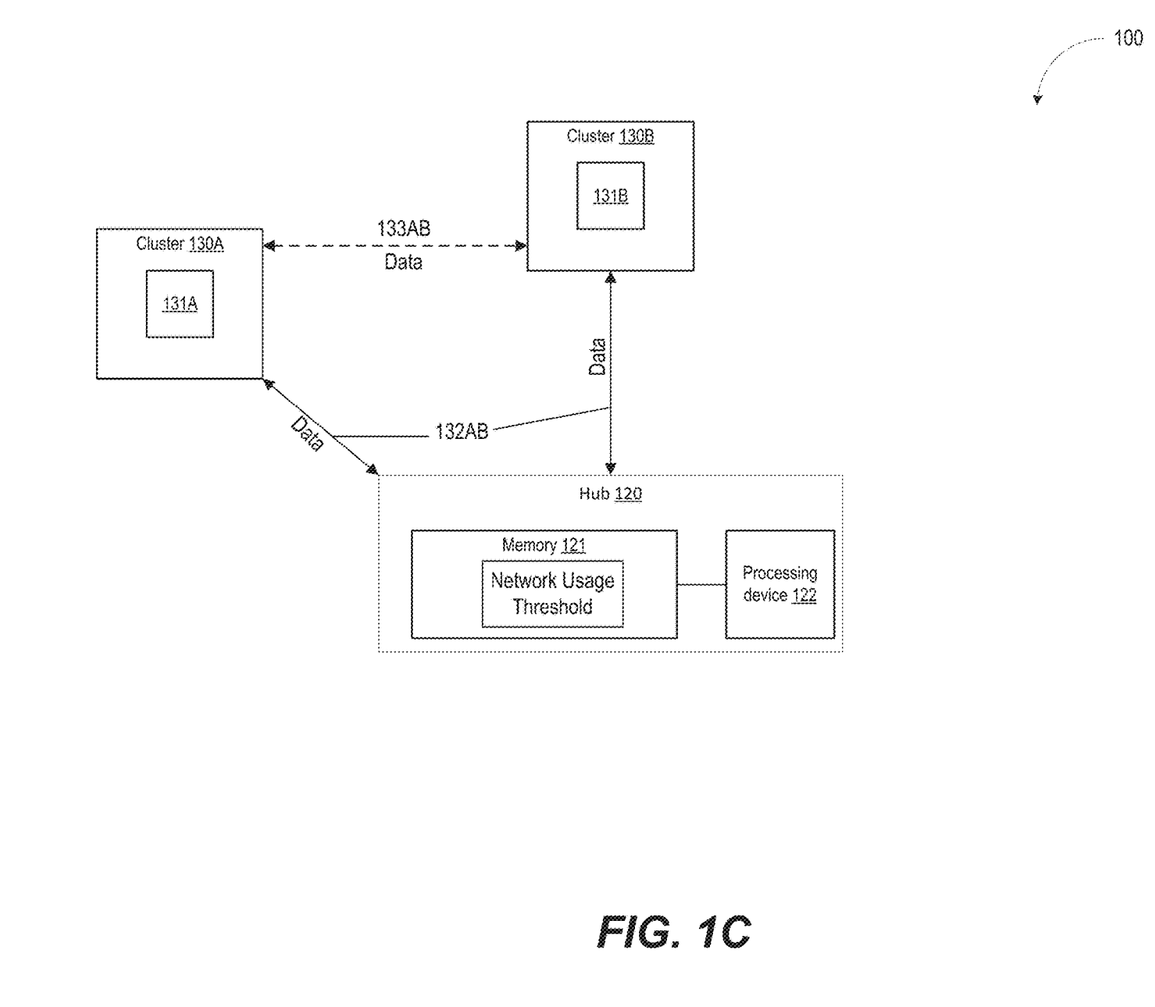
FIG. 1C is a block diagram illustrating communication between two clusters in a cluster network, in accordance with some embodiments of the present disclosure.
Figure 2A:
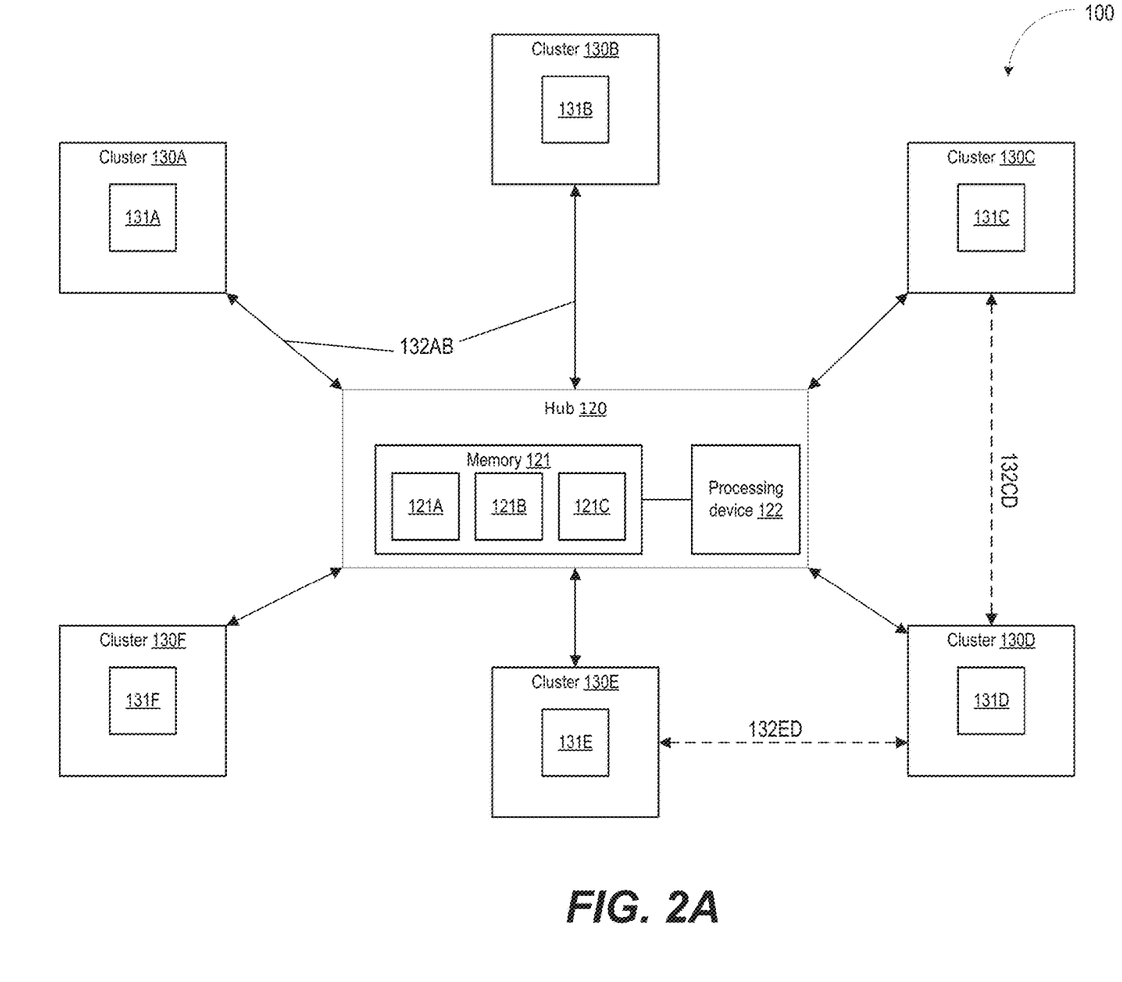
FIG. 2A is a block diagram illustrating connections between clusters in the cluster network of FIG. 1A, in accordance with some embodiments of the present disclosure.

FIG. 2A (and FIG. 1C) illustrates an example scenario of the network 100, in which cluster 130A may wish to communicate with cluster 130B. Thus, remote agent 131A may transmit the data to be communicated (via its tunnel connection) to hub 120, which may utilize its routing information to route the data to the cluster 130B, thereby forming an indirect connection 132AB between cluster 130A and 130B. As discussed herein, the hub 120 may include a routing table with cluster address and IP address information for each cluster 130 since the remote agent 131 of each cluster 130 has advertised that information to the hub 120. Hub 120 may record the indirect connection 132AB and begin monitoring its usage information. FIG. 2A also illustrates direct connection 132CD between clusters 130C and 130D and direct connection 132ED between clusters 130E and 130D.

Hub 120 may continuously monitor the network usage information of indirect connection 132AB and compare it to the network usage threshold stored in memory 121. In addition, the hub 120 may periodically query remote agents 131E and 131D and 131C and 131D for network usage information regarding the network usage of direct connections 132 ED and 132 CD respectively. The hub 120 may compare the network usage information of each connection to the network usage threshold. In the example of FIG. 2A, the network usage threshold may be based on maximum throughput and maximum latency (e.g., time it takes for a data packet to travel a certain distance over the network 100) values. More specifically, the network usage threshold may indicate a maximum throughput of 90 kilobits per second (kbits/sec) and a maximum latency of 90 microseconds (us). However, as discussed above, the network usage threshold may be based on any appropriate combination of threshold values for each of one or more of the usage factors enumerated herein.

The network usage information of indirect connection 132AB may indicate that the throughput of indirect connection 132AB is 100 kbits/sec and that the latency is 100 us. Hub 120 may compare this information to the network usage threshold and determine that the usage of connection 132AB exceeds the network usage threshold. Thus, hub 120 may instruct the remote agents 131A and 131B of clusters 130A and 130B respectively to establish a direct connection 133AB (shown in FIG. 2B) between them and provide them with the necessary addressing information to establish the direct connection. Hub 120 may record the creation of direct connection 133AB as well as removal of indirect connection 132AB within its connection table (stored within network addressing database 121B). Hub 120 may also periodically query cluster 130E for a network usage information report regarding the network usage of direct connection 132ED and receive the report in response to the query. The network usage information report for direct connection 132ED may indicate that the throughput of direct connection 132ED is 150 kbits/sec and that the latency is 110 us. Similarly, hub 120 also periodically query cluster 130C for a network usage information report regarding the network usage of direct connection 132CD and receive the report in response to the query. The network usage information report for cluster 132CD may indicate that the throughput of direct connection 132CD is 85 kbits/sec and that the latency is 70 us.

Figure 2B:
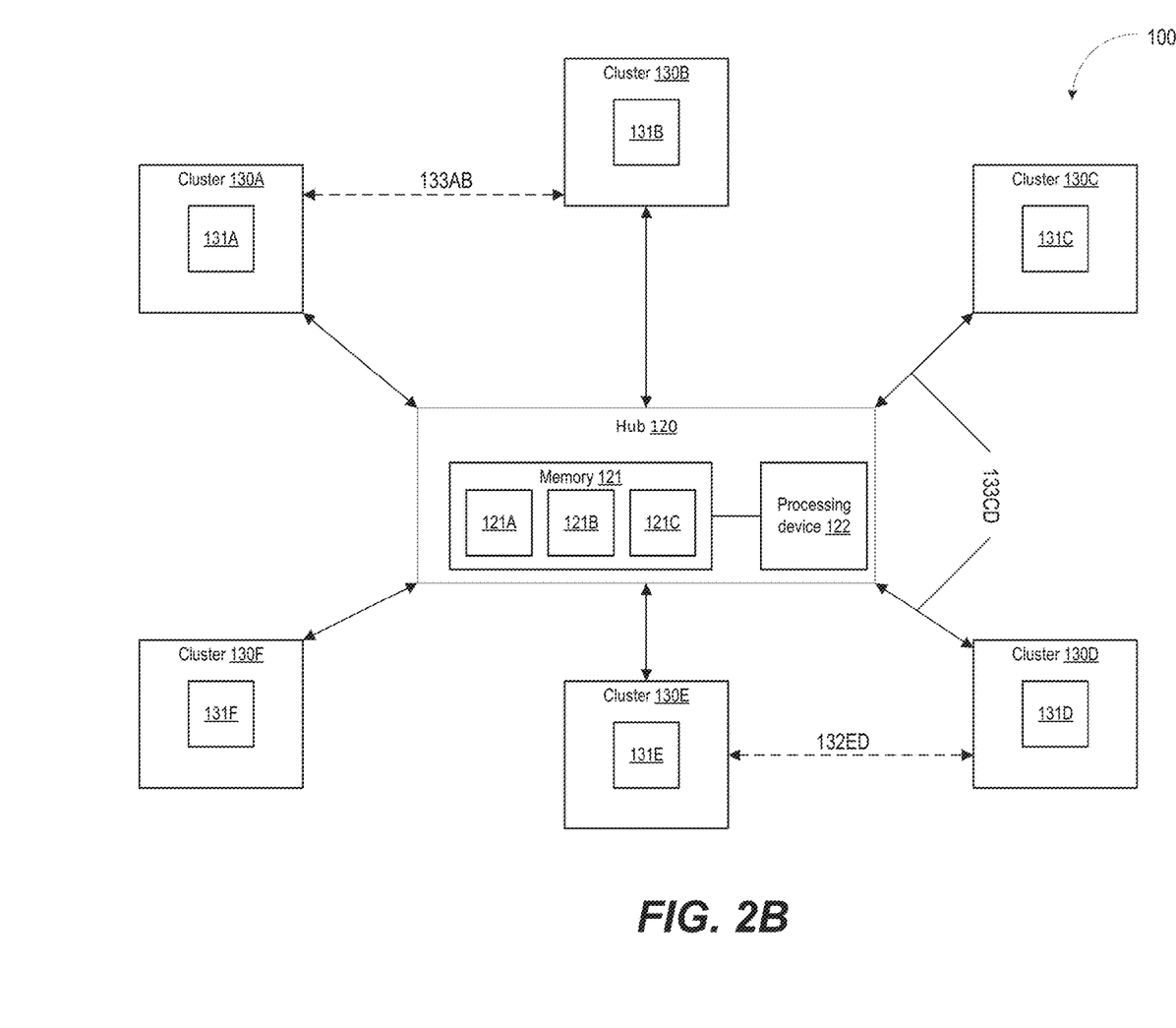
FIG. 2B is a block diagram illustrating connections between clusters in the cluster network of FIG. 1A, in accordance with some embodiments of the present disclosure.

Hub 120 may determine that the network usage of direct connection 132ED is above the network usage threshold and that it should continue to be used by cluster 130E and cluster 130D for communication between them. However, the hub 120 may determine that the network usage of direct connection 132CD is below the network usage threshold, and thus may instruct clusters 130C and 130D to terminate the connection 132CD. Hub 120 may record the removal of direct connection 132CD within its connection table (stored within network addressing database 121B). FIG. 2B shows the network 100 after direct connection 132CD and indirect connection 132AB have been removed and direct connection 133AB has been established. In the example of FIGS. 2A and 2B, clusters 130C and 130D may continue communicating with each other by means of an indirect connection 133CD established between them via hub 120. Thereafter, hub 120 may begin periodically querying clusters 130A and 130B for usage information reports regarding network usage of the direct connection 133AB as well as continue to query clusters 130E and 130D for usage information reports regarding usage information of the direct connection 132ED. Hub 120 may also record the new indirect connection 133CD in its connection table and monitor the new indirect connection 133CD.

Figure 3A:
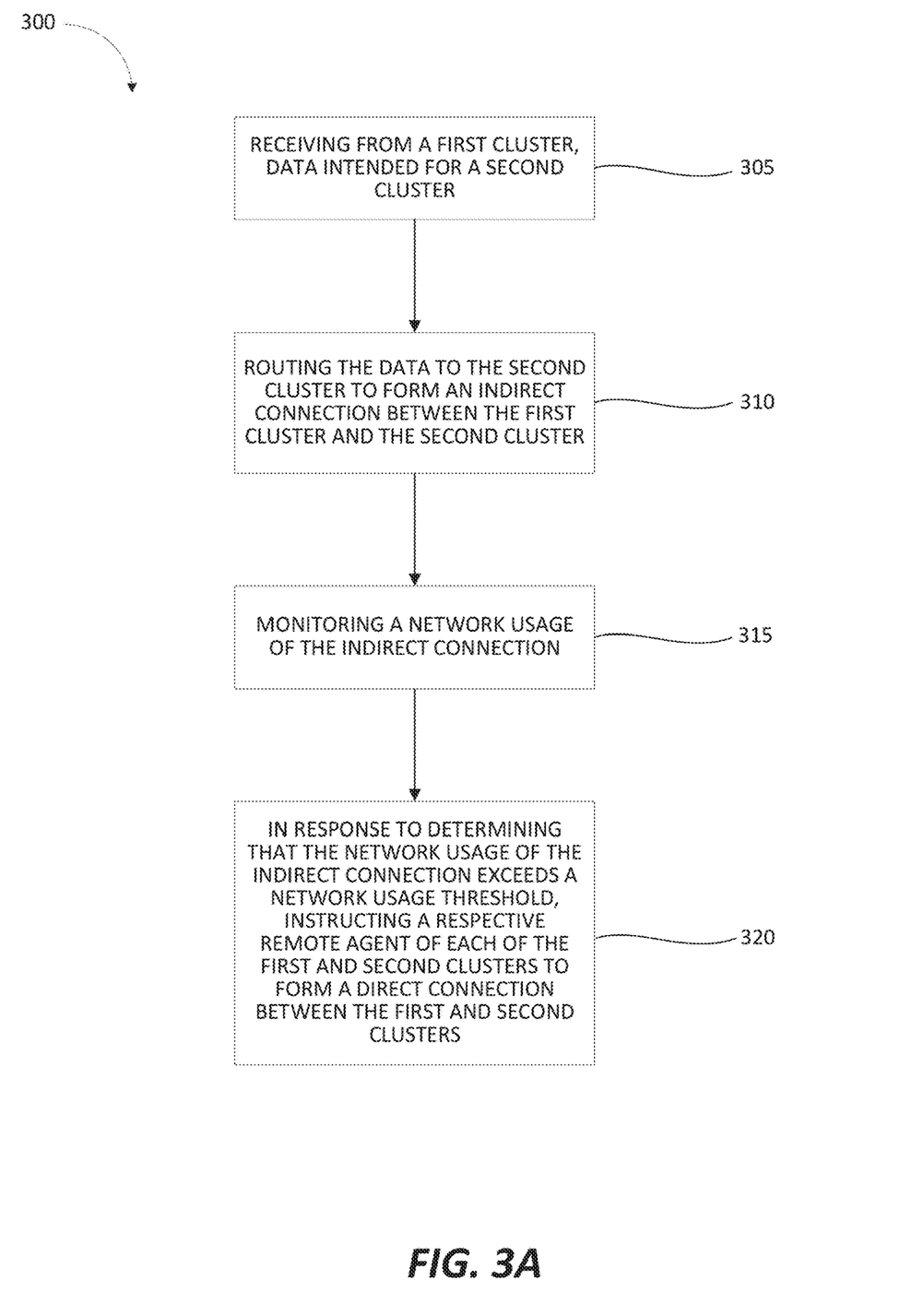
FIG. 3A is a flow diagram illustrating a method, in accordance with some embodiments of the present disclosure.

FIG. 3A is a flow diagram illustrating a method 300 for implementing an elastic hub and spoke network model, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a computing device (e.g., hub 120 illustrated in FIGS. 1A and 1C).

Referring also to FIG. 1A, at block 305, the hub 120 may receive from cluster 130A (e.g., a first cluster), data intended for a cluster 130B (e.g., a second cluster). More specifically, when cluster 130A wishes to communicate with an address in cluster 130B, it may transmit the data to be communicated (via its tunnel connection) to hub 120, which may form an indirect connection to cluster 130B. As used herein, an indirect connection may refer to a connection between two clusters 130 formed via the hub 120. Thus, when cluster 130A transmits data intended for cluster 130B to the hub 120, at block 310, the hub 120 may utilize its routing information to route the data to the cluster 130B, thereby forming an indirect connection between clusters 130A and 130B. The hub 120 may also detect this indirect connection and record it within the connection table of the network addressing database 121B as discussed in further detail herein. The hub 120 may maintain a record of all connections (direct and indirect) between clusters 130 and at block 315, may monitor the network usage of the indirect connection between clusters 130A and 130B based on the indirect connection's network usage information. The network usage information of a connection (direct or indirect) may include a number of factors including the time length of the connection, the data throughput of the connection, bandwidth of the connection, and the latency of the connection, for example. The hub 120 may also include (e.g., in memory 121) a network usage threshold, which may be defined by e.g., a network administrator and may dictate when a direct connection between two clusters 130 should be created and when it should be closed. The network usage threshold may be based on threshold values for a number of the network usage factors including the time length of the connection between two clusters 130, a maximum data throughput of the connection, a maximum bandwidth of the connection, and a maximum latency of the connection, for example. The network usage threshold may be based on one or more of the above enumerated factors as discussed in further detail herein. The hub 120 may further include network addressing database 121B which may include a routing table having the cluster address of each cluster 130 as well as the IP addresses of the respective components of each cluster 130 (e.g., as advertised by each cluster 130's remote agent 131). The network addressing database 121B may further include a connection table which the hub 120 may use to record all inter-cluster connections.

At block 320, in response to determining that the network usage for the indirect connection between cluster 130A and 130B exceeds the network usage threshold, the hub 120 may instruct the remote agents 131A and 131B of clusters 130A and 130B respectively (via their respective tunnel connections to the hub 120) to establish a direct connection with each other. The direct connection may be a VPN tunnel, for example. The hub 120 may include in its instruction to remote agent 131A, the cluster address of the cluster 130B and vice versa to allow the remote agents 131A and 131B to establish the direct connection, and each of the remote agents 131A and 131B may update their routing table with this information, so that the hub 120 is no longer a hop on the route between clusters 130A and 130B. In addition, each of the remote agents 131A and 131B may advertise IP addresses of nodes in their host clusters (130A and 130B respectively) to each other so as to facilitate communication between them. Thus, information from cluster 130A that is destined for cluster 130B may be routed directly to cluster 130B and so on.

Figure 3B:
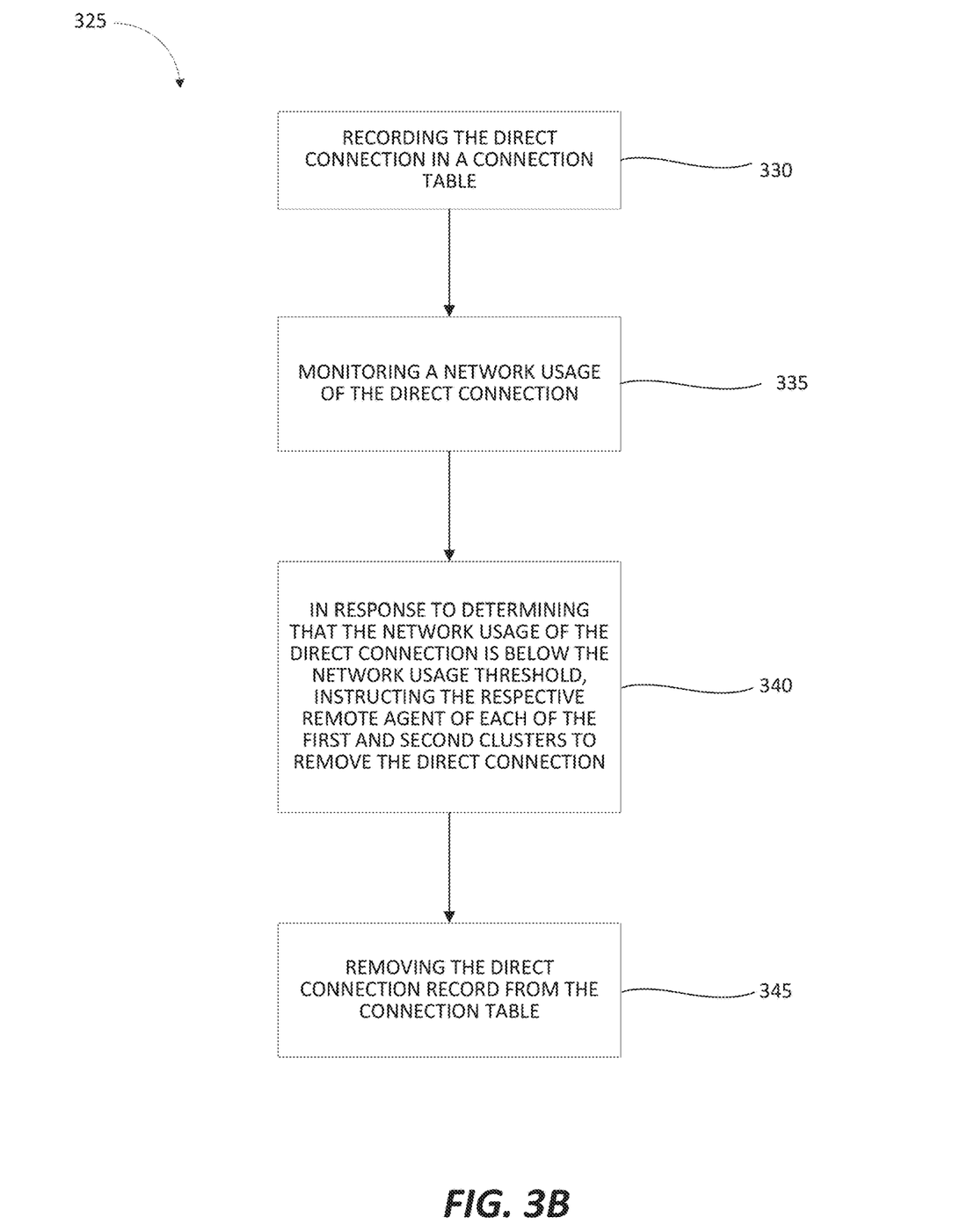
FIG. 3B is a flow diagram illustrating a method, in accordance with some embodiments of the present disclosure.

FIG. 3B is a flow diagram illustrating a method 325 for implementing an elastic hub and spoke network topology, in accordance with some embodiments. Method 325 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a computing device (e.g., hub 120 illustrated in FIGS. 1A and 1C).

Referring also to FIG. 1A, at block 330, the hub 120 may record the direct connection between clusters 130A and 130B in its connection table. At block 335, the hub 120 may monitor network usage of the direct connection by periodically requesting network usage information reports of the direct connection between clusters 130A and 130B. Remote agents 131A and 131B may monitor the network usage information of the direct connection. As discussed above, each remote agent 131A and 131B may monitor the time length of the direct connection, the data throughput of the direct connection, bandwidth of the direct connection, and the latency of the direct connection, for example. Each remote agent 131A and 131B may report the network usage information of the direct connection to the hub 120 in response to requests for such information from the hub 120.

At block 340, if the hub 120 determines that the network usage of the direct connection between clusters 130A and 130B has fallen below the network usage threshold, it may instruct the remote agents 131A and 131B to close the direct connection and revert back to using the indirect connection they previously utilized to communicate. In some embodiments, if the hub 120 determines that the network usage of the direct connection between clusters 130A and 130B has fallen below the network usage threshold, it may instruct the remote agents 131A and 131B to close the direct connection and cease communication between those clusters. In some embodiments, in response to receiving usage information for a direct connection that indicates that the network usage of that direct connection is below the network usage threshold, the hub 120 may wait until a subsequent network usage level report before instructing the remote agent to close the direct connection. For example, in response to receiving network usage information for a direct connection that indicates that the direct connection is below the network usage threshold, the hub 120 may monitor subsequent network usage information reports from that remote agent 131 for a certain amount of time to see if the network usage returns to above the network usage threshold, and if they do not, instruct the remote agent 131 to close the direct connection. At block 345, the hub 120 may remove the direct connection from the connection table.

Figure 3C:
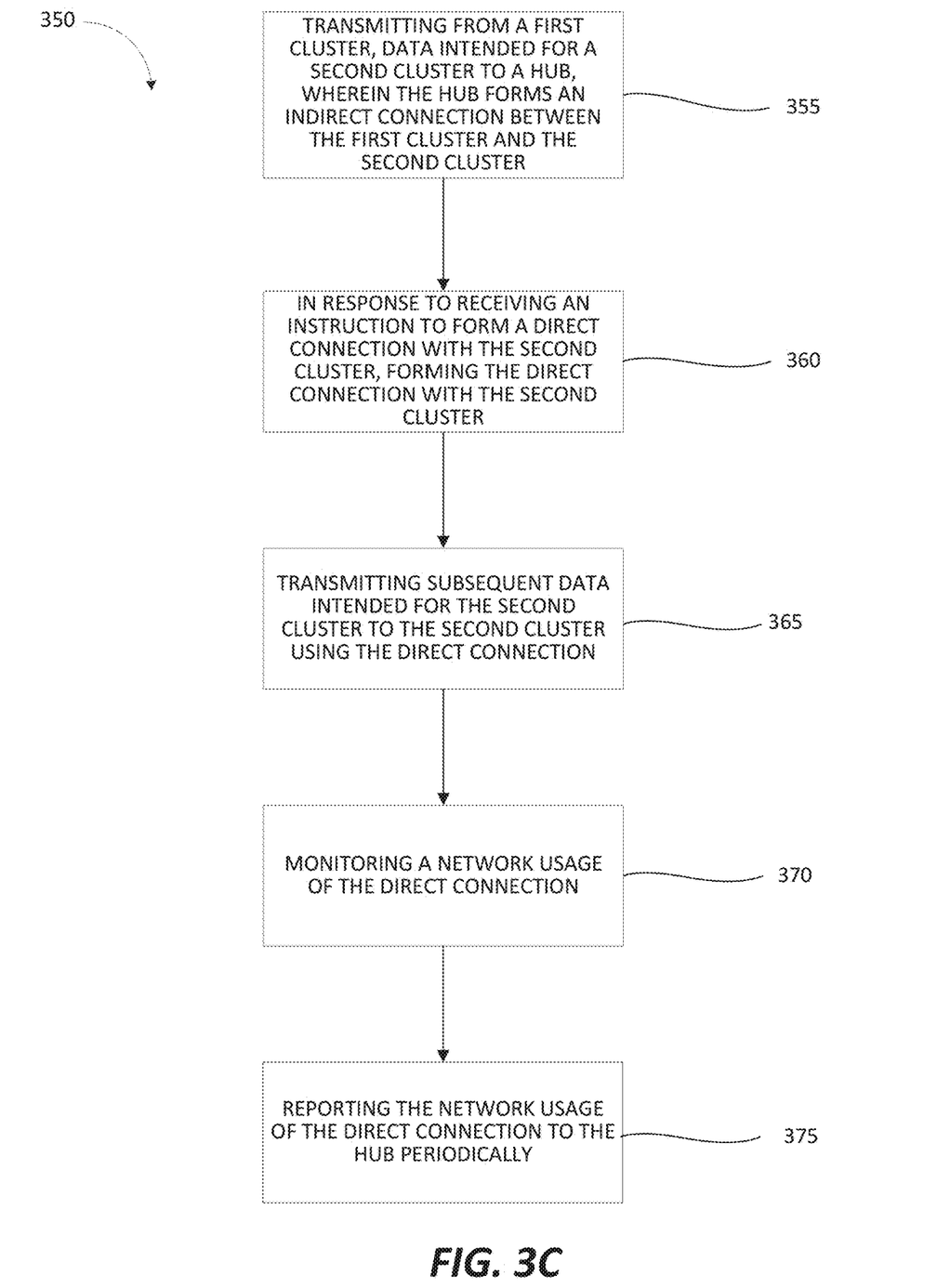
FIG. 3C is a flow diagram illustrating a method, in accordance with some embodiments of the present disclosure.

FIG. 3C is a flow diagram illustrating a method 350 for implementing an elastic hub and spoke network topology, in accordance with some embodiments. Method 350 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 350 may be performed by a computing device (e.g., computing device 110A executing remote agent 131A, as illustrated in FIG. 1B).

Referring also to FIGS. 1A and 1B, at block 355, computing device 110A of cluster 130A may transmit data intended for cluster 130B to the hub 120, which may utilize the routing information in network addressing database 121B to route the data to the cluster 130B, thereby forming an indirect connection between clusters 130A and 130B. At block 360, computing device 110A may receive an instruction from hub 120 to establish a direct connection with cluster 130B. The direct connection may be a VPN tunnel, for example. The hub 120 may include in its instruction the cluster address of the cluster 130B to allow computing device 110A to establish the direct connection. Computing device 110A may update its routing table with this information, so that the hub 120 is no longer a hop on the route between clusters 130A and 130B. In addition, the computing device may advertise IP addresses of nodes in its host cluster (130A) to the remote agent 131B of cluster 130B so as to facilitate communication between them. Thus, at block 365, information from cluster 130A that is destined for cluster 130B may be routed directly to cluster 130B by computing device 110A using the direct connection.

At block 370, computing device 110A may monitor the network usage information of the direct connection between clusters 130A and 130B. As discussed above, computing device 110A may monitor the time length of the direct connection, the data throughput of the direct connection, bandwidth of the direct connection, and the latency of the direct connection, for example. At block 375, computing device 110A may report the network usage information of the direct connection to the hub 120 in response to requests for such information from the hub 120.

Figure 4:
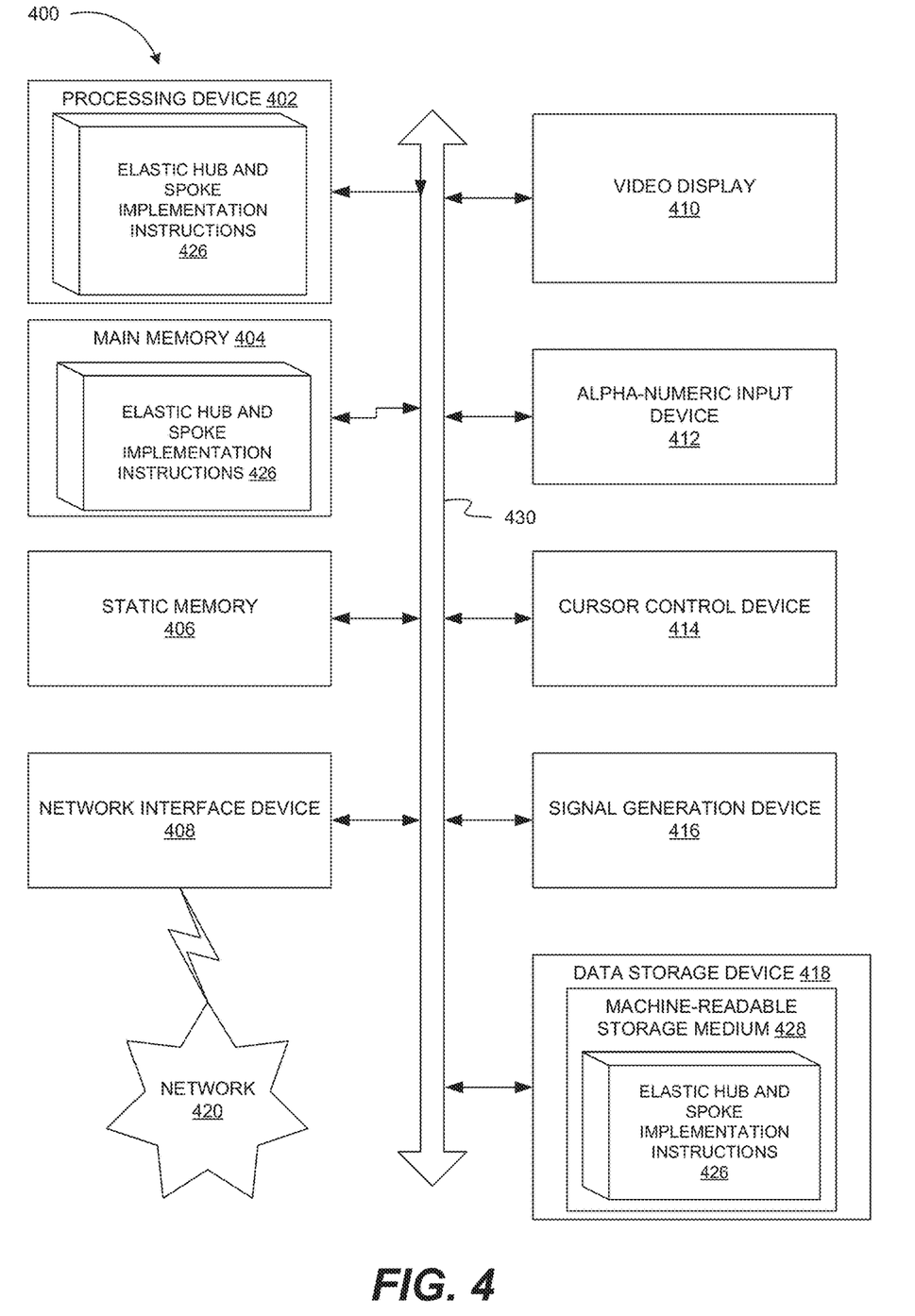
FIG. 4 is a block diagram of an example computing device, in accordance with some embodiments of the present disclosure.

FIG. 4 illustrates a diagrammatic representation of a machine in the example form of a computer system 400 within which a set of instructions, for causing the machine to perform any one or more of the methodologies discussed herein for implementing an elastic hub and spoke network architecture. More specifically, the machine may receive, from a first cluster, data intended for a second cluster and route the data to the second cluster, thereby forming an indirect connection between a first cluster and the second cluster. An indirect connection may refer to a connection between two clusters 130 formed via the hub 120. The machine may monitor a network usage of the indirect connection and in response to determining that the network usage of the indirect connection exceeds a network usage threshold, instruct a respective remote agent of each of the first and second clusters to form a direct connection between the first and second clusters. The direct connection may be a virtual private network (VPN) tunnel, for example. Upon establishing the direct connection, the respective remote agents of the first and second clusters may advertise internet protocol (IP) addresses of components in their respective host clusters to each other, to facilitate communication between the two. The machine may monitor a network usage of the direct connection by requesting reports on the network usage of the direct connection from the respective remote agents of the first and second clusters. In response to determining that the network usage of the direct connection is below the network usage threshold, the machine may instruct the respective remote agent of each of the first and second clusters to remove the direct connection.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 400 may be representative of a server, such as DSL server 110 configured to perform multi-level task debugging.

The exemplary computer system 400 includes a processing device 402, a main memory 404 (e.g., read-only memory (ROM), flash memory, dynamic random access memory (DRAM), a static memory 406 (e.g., flash memory, static random access memory (SRAM), etc.), and a data storage device 418, which communicate with each other via a bus 430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 400 may further include a network interface device 408 which may communicate with a network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute network topology generation instructions 426, for performing the operations and steps discussed herein.

The data storage device 418 may include a machine-readable storage medium 428, on which is stored one or more sets of elastic hub and spoke implementation instructions 426 (e.g., software) embodying any one or more of the methodologies of functions described herein, including instructions to cause the processing device 402 to execute scripts 121A shown in FIG. 1B. The elastic hub and spoke implementation instructions 426 may also reside, completely or at least partially, within the main memory 404 or within the processing device 402 during execution thereof by the computer system 400; the main memory 404 and the processing device 402 also constituting machine-readable storage media. The elastic hub and spoke implementation instructions 426 may further be transmitted or received over a network 420 via the network interface device 408.

The machine-readable storage medium 428 may also be used to store instructions to perform a method for object analysis/validation event publishing, as described herein. While the machine-readable storage medium 428 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM), magneto-optical storage medium; read-only memory (ROM); random-access memory (RAM); erasable programmable memory (e.g., EPROM and EEPROM); flash memory; or another type of medium suitable for storing electronic instructions.

Example 1 is a method comprising: receiving from a first cluster, data intended for a second cluster, routing the data to the second cluster to form an indirect connection between the first cluster and the second cluster, monitoring a network usage of the indirect connection, and in response to determining that the network usage of the indirect connection exceeds a network usage threshold, instructing a respective remote agent of each of the first and second clusters to form a direct connection between the first and second clusters.

Example 2 is the method of example 1, wherein the network usage threshold is defined in view of threshold values for at least one of a time length of a connection, a throughput of the connection, a bandwidth of the connection, or a latency of the connection.

Example 3 is the method of example 1, further comprising: recording the direct connection in a connection table, monitoring a network usage of the direct connection, in response to determining that the network usage of the direct connection is below the network usage threshold, instructing the respective remote agent of each of the first and second clusters to remove the direct connection, and removing the direct connection record from the connection table.

Example 4 is the method of example 3, wherein monitoring the network usage of the direct connection comprises: periodically querying the respective remote agent of each of the first and second clusters for network usage information of the direct connection.

Example 5 is the method of example 1, wherein the direct connection is a virtual private network (VPN) tunnel.

Example 6 is the method of example 1, wherein the respective remote agent of each of the first and second clusters advertise a cluster address and an internet protocol (IP) address of one or more nodes in their respective cluster to a hub.

Example 7 is the method of example 1, wherein the indirect connection comprises a hub between the first and second clusters and the direct connection does not comprise the hub between the first and second clusters.

Example 8 is a system comprising: a memory to store a network usage threshold and a processing device, operatively coupled to the memory, the processing device to: receive from a first cluster, data intended for a second cluster, route the data to the second cluster to form an indirect connection between the first cluster and the second cluster, monitor a network usage of the indirect connection, and in response to determining that the network usage of the indirect connection exceeds a network usage threshold, instruct a respective remote agent of each of the first and second clusters to form a direct connection between the first and second clusters.

Example 9 is the system of example 8, wherein the network usage threshold is defined in view of threshold values for at least one of a time length of a connection, a maximum throughput of the connection, a maximum bandwidth of the connection, or a maximum latency of the connection.

Example 10 is the system of example 8, wherein the processing device is further to: record the direct connection is a connection table, monitor a network usage of the direct connection, in response to determining that the network usage of the direct connection is below the network usage threshold, instruct the respective remote agent of each of the first and second clusters to remove the direct connection, and remove the direct connection record from the connection table.

Example 11 is the system of example 10, wherein to monitor the network usage of the direct connection, the processing device is to: periodically query the respective remote agent of each of the first and second clusters for network usage information of the direct connection.

Example 12 is the system of example 8, wherein the direct connection is a virtual private network (VPN) tunnel.

Example 13 is the system of example 8, wherein the respective remote agent of each of the first and second clusters advertise a cluster address and an internet protocol (IP) address of one or more nodes in their respective cluster to the hub.

Example 14 is the system of example 8, wherein the indirect connection comprises a hub between the first and second clusters and the direct connection does not comprise the hub between the first and second clusters.

Example 15 is a non-transitory computer readable storage medium, having instructions stored thereon that, when executed by a processing device, cause the processing device to: receive from a first cluster, data intended for a second cluster, route the data to the second cluster to form an indirect connection between the first cluster and the second cluster, monitor a network usage of the indirect connection, and in response to determining that the network usage of the indirect connection exceeds a network usage threshold, instructing a respective remote agent of each of the first and second clusters to form a direct connection between the first and second clusters.

Example 16 is the non-transitory computer readable storage medium of example 15, wherein the network usage threshold is defined in view of threshold values for at least one of a time length of a connection, a maximum throughput of the connection, a maximum bandwidth of the connection, or a maximum latency of the connection.

Example 17 is the non-transitory computer readable storage medium of example 15, wherein the processing device is further to: record the direct connection in a connection table, monitor a network usage of the direct connection, in response to determining that the network usage of the direct connection is below the network usage threshold, instruct the respective remote agent of each of the first and second clusters to remove the direct connection, and remove the direct connection record from the connection table.

Example 18 is the non-transitory computer readable storage medium of example 17, wherein to monitor the network usage of the direct connection, the processing device is to: periodically query the respective remote agent of each of the first and second clusters for network usage information of the direct connection.

Example 19 is the non-transitory computer readable storage medium of example 15, wherein the direct connection is a virtual private network (VPN) tunnel.

Example 20 is the non-transitory computer readable storage medium of example 15, wherein the respective remote agent of each of the first and second clusters advertise a cluster address and an internet protocol (IP) address of one or more nodes in their respective cluster to the hub.

Example 21 is the non-transitory computer readable storage medium of example 15, wherein the indirect connection comprises a hub between the first and second clusters and the direct connection does not comprise the hub between the first and second clusters.

Example 22 is a method comprising: transmitting from a first cluster, data intended for a second cluster to a hub, wherein the hub forms an indirect connection between the first cluster and the second cluster, in response to receiving an instruction to form a direct connection with the second cluster, forming the direct connection with the second cluster, transmitting subsequent data intended for the second cluster to the second cluster using the direct connection, monitoring a network usage of the direct connection, and reporting the network usage of the direct connection to the hub periodically.

Example 23 is the method of example 22, further comprising: advertising an internet protocol (IP) address of one or more nodes of the first cluster to the second cluster, and receiving an IP address of one or more nodes of the second cluster.

Example 24 is the method of example 22, further comprising: in response to receiving an instruction to close the direct connection, closing the direct connection, and communicating with the second cluster via the indirect connection.

Example 25 is the method of example 23, wherein the instruction to form a direct connection with the second cluster comprises a cluster address of the second cluster.

Example 26 is the method of example 25, further comprising updating a routing table with the cluster address of the second cluster and the IP address of the one or more nodes of the second cluster such that the hub is no longer a hop on a route to the second cluster.

Example 27 is the method of example 22, wherein the direct connection is a virtual private network (VPN) tunnel.

Example 28 is the method of example 22, wherein the reporting comprises transmitting network usage information of the direct connection to the hub in response to a request from the hub for network usage information.

Example 29 is a system comprising: a memory, and a processing device operatively coupled to the memory, the processing device to: transmit from a first cluster, data intended for a second cluster to a hub, wherein the hub forms an indirect connection between the first cluster and the second cluster, in response to receiving an instruction to form a direct connection with the second cluster, form the direct connection with the second cluster, transmit subsequent data intended for the second cluster to the second cluster using the direct connection, monitor a network usage of the direct connection, and report the network usage of the direct connection to the hub periodically.

Example 30 is the system of example 29, wherein the processing device is further to: advertise an internet protocol (IP) address of one or more nodes of the first cluster to the second cluster, and receive an IP address of one or more nodes of the second cluster.

Example 31 is the system of example 29, wherein the processing device is further to: in response to receiving an instruction to close the direct connection, closing the direct connection; and communicate with the second cluster via the indirect connection.

Example 32 is the system of example 30, wherein the instruction to form a direct connection with the second cluster comprises a cluster address of the second cluster.

Example 33 is the system of example 32, wherein the processing device is further to update a routing table with the cluster address of the second cluster and the IP address of the one or more nodes of the second cluster such that the hub is no longer a hop on a route to the second node.

Example 34 is the system of example 29, wherein the direct connection is a virtual private network (VPN) tunnel.

Example 35 is the system of example 29, wherein to report the network usage of the direct connection, the processing device is to transmit network usage information of the direct connection to the hub in response to a request from the hub for network usage information.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
receiving from a first cluster, data intended for a second cluster;
routing the data to the second cluster to form an indirect connection between the first cluster and the second cluster, wherein the indirect connection comprises a hub between the first and second clusters;
monitoring a network usage of the indirect connection; and
in response to determining that the network usage of the indirect connection exceeds a network usage threshold that is defined in view of a threshold value of a time length of a connection:
instructing a respective remote agent executing on each of the first and second clusters to form a direct tunnel connection between the first and second clusters;
periodically querying the respective remote agent of each of the first and second clusters to determine a network usage information of the direct connection; and
removing the indirect connection between the first and second clusters.

2. The method of claim 1, wherein the network usage threshold is further defined in view of threshold values for at least one of a throughput of the connection, a bandwidth of the connection, or a latency of the connection.

3. The method of claim 1, further comprising:
recording the direct connection in a connection table;
in response to determining that the network usage of the direct connection is below the network usage threshold, instructing the respective remote agent of each of the first and second clusters to remove the direct connection; and
removing the direct connection record from the connection table.

4. The method of claim 1, wherein the direct connection is a virtual private network (VPN) tunnel.

5. The method of claim 1, wherein the respective remote agent of each of the first and second clusters advertise a cluster address and an internet protocol (IP) address of one or more of nodes in their respective cluster to a hub.

6. The method of claim 1, wherein the direct connection does not comprise the hub between the first and second clusters.

7. A system comprising:
a memory to store one or more network usage thresholds; and
a processing device, operatively coupled to the memory, the processing device to:
receive from a first cluster, data intended for a second cluster;
route the data to the second cluster to form an indirect connection between the first cluster and the second cluster, wherein the indirect connection comprises a hub between the first and second clusters;
monitor a network usage of the indirect connection; and
in response to determining that the network usage of the indirect connection exceeds a network usage threshold that is defined in view of a threshold value of a time length of a connection:
instruct a respective remote agent executing on each of the first and second clusters to form a direct tunnel connection between the first and second clusters;
periodically query the respective remote agent of each of the first and second clusters to determine a network usage information of the direct connection; and
remove the indirect connection between the first and second clusters.

8. The system of claim 7, wherein the network usage threshold is further defined in view of threshold values for at least one of a maximum throughput of the connection, a maximum bandwidth of the connection, or a maximum latency of the connection.

9. The system of claim 7, wherein the processing device is further to:
record the direct connection is a connection table;
in response to determining that the network usage of the direct connection is below the network usage threshold, instruct the respective remote agent of each of the first and second clusters to remove the direct connection; and
remove the direct connection record from the connection table.

10. The system of claim 7, wherein the direct connection is a virtual private network (VPN) tunnel.

11. The system of claim 7, wherein the respective remote agent of each of the first and second clusters advertise a cluster address and an internet protocol (IP) address of one or more of nodes in their respective cluster to a hub.

12. The system of claim 7, wherein the direct connection does not comprise the hub between the first and second clusters.

13. A non-transitory computer readable storage medium, having instructions stored thereon that, when executed by a processing device, cause the processing device to:
receive from a first cluster, data intended for a second cluster;
route the data to the second cluster to form an indirect connection between the first cluster and the second cluster, wherein the indirect connection comprises a hub between the first and second clusters;
monitor a network usage of the indirect connection; and
in response to determining that the network usage of the indirect connection exceeds a network usage threshold that is defined in view of a threshold value of a time length of a connection:
instruct a respective remote agent executing on each of the first and second clusters to form a direct tunnel connection between the first and second clusters;
periodically query the respective remote agent of each of the first and second clusters to determine a network usage information of the direct connection; and
remove the indirect connection between the first and second clusters.

14. The non-transitory computer readable storage medium of claim 13, wherein the network usage threshold is further defined in view of threshold values for at least one of a maximum throughput of the connection, a maximum bandwidth of the connection, or a maximum latency of the connection.

15. The non-transitory computer readable storage medium of claim 13, wherein the processing device is further to:
record the direct connection is a connection table;
in response to determining that the network usage of the direct connection is below the network usage threshold, instruct the respective remote agent of each of the first and second clusters to remove the direct connection; and remove the direct connection record from the connection table.

16. The non-transitory computer readable storage medium of claim 13, wherein the direct connection is a virtual private network (VPN) tunnel.

17. The non-transitory computer readable storage medium of claim 13, wherein the respective remote agent of each of the first and second clusters advertise a cluster address and an internet protocol (IP) address of one or more of nodes in their respective cluster to a hub.

* * * * *